US008026322B2

(12) United States Patent
Verleysen

(10) Patent No.: US 8,026,322 B2
(45) Date of Patent: Sep. 27, 2011

(54) METHOD AND APPARATUS FOR CONTROLLING THE RECOVERY OF SOLID POLYOLEFIN FROM A CONTINUOUS REACTION ZONE

(75) Inventor: Mark Verleysen, Ekeren (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 815 days.

(21) Appl. No.: 10/589,306

(22) PCT Filed: Feb. 9, 2005

(86) PCT No.: PCT/EP2005/050566
§ 371 (c)(1),
(2), (4) Date: Apr. 9, 2007

(87) PCT Pub. No.: WO2005/079972
PCT Pub. Date: Sep. 1, 2005

(65) Prior Publication Data
US 2007/0282082 A1 Dec. 6, 2007

(30) Foreign Application Priority Data

Feb. 13, 2004 (EP) .................................... 04100577

(51) Int. Cl.
*C08F 2/01* (2006.01)
(52) U.S. Cl. ......................................................... 526/64
(58) Field of Classification Search ..................... 526/64
See application file for complete search history.

(56) References Cited

U.S. PATENT DOCUMENTS
5,462,998 A * 10/1995 Tanifuji et al. .................. 526/67
* cited by examiner Primary Examiner — Caixia Lu

(57) ABSTRACT

A Polymerisation process and a loop reactor comprising polymerising olefins in a liquid diluent to produce a liquid slurry containing particles of normally solid polymer within the loop reactor, allowing the polymer to settle in a settling leg, periodically opening a 180° rotating product take-off valve located at the end of the settling leg to allow a charge of particles to flow out of the settling leg, the product take-off valve being operated by a pneumatically driven double-acting actuator, the pneumatic system being regulated by a system comprising pneumatic control valves, the improvement which consists in using automatic control valves, which are automatic v-ball valves.

1 Claim, 5 Drawing Sheets

Fig. 4
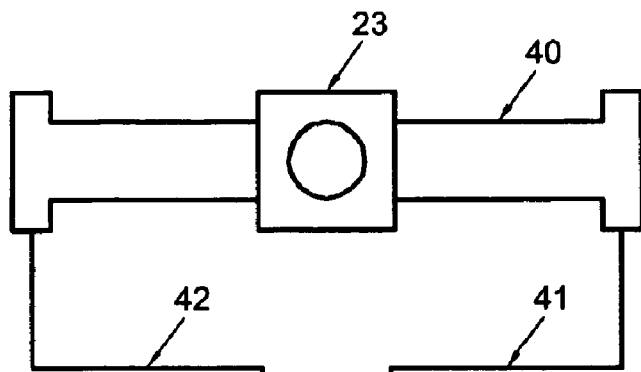
a
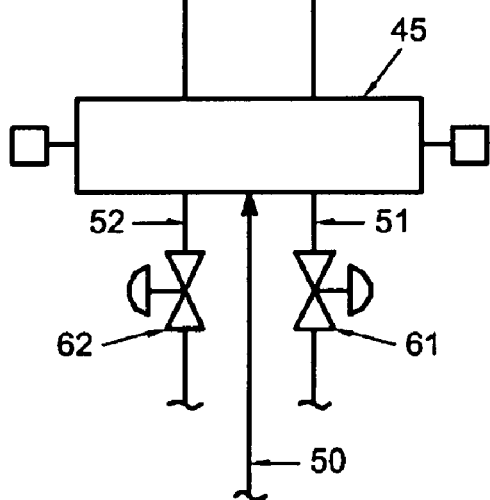
b
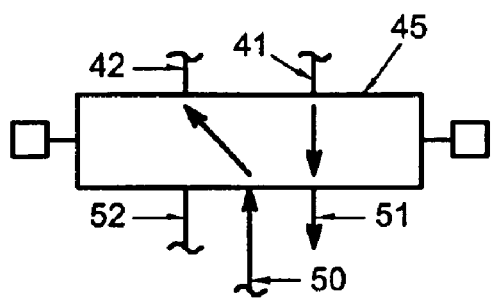
c
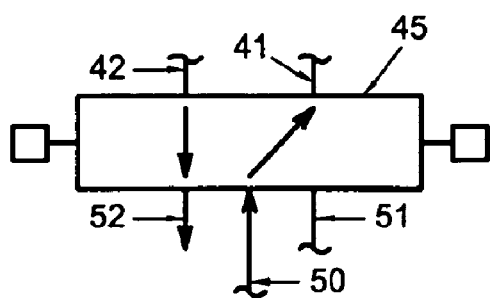

METHOD AND APPARATUS FOR CONTROLLING THE RECOVERY OF SOLID POLYOLEFIN FROM A CONTINUOUS REACTION ZONE

This invention relates to the withdrawal of solid polyolefin from a slurry of such solids. In a particular aspect, it relates to a method and apparatus for controlling the recovery of particulate polyolefin from a slurry thereof, for example from a stream of polymerisation mixture continuously flowing in a loop reactor.

U.S. Pat. No. 3,242,150 disclosed an improvement to loop reactors consisting in adding to the bottom part of a loop reactor a receiving zone, since known as settling leg, wherein the solids settle by gravitation, and withdrawing a fraction concentrated in solids from said receiving zone.

U.S. Pat. No. 3,293,000 disclosed a loop reactor with several settling legs. Control of the valve is described at column 3, lines 2 to 22.

U.S. Pat. No. 3,374,211 disclosed a modified process for removing polymer.

More recently, U.S. Pat. No. 5,183,866 related to the employment of a flash line heater in conjunction with the periodic operation of a settling leg of a loop reactor. The process is characterised by the fact that the elongated zone is constructed such that the flow time of the charge of slurry in an elongated confined zone including the flash line heater is equal to at least about 25% of the time between the closing of the settling leg valve and the next opening of the settling leg valve.

U.S. Pat. No. 5,455,314 discloses a method for controlling in a continuous manner the withdrawal of a reaction slurry containing a polymer product from a polymerization reactor by manipulating continuously a V-notch ball valve in a primary effluent line and by automatically open a control valve in a redundant line as a backup for the primary control valve in the event the primary line becomes plugged.

The invention relates to a polymerisation process comprising polymerising olefins in a liquid diluent to produce a liquid slurry containing particles of normally solid polymer within a loop reactor, allowing the polymer to settle in a settling leg, periodically opening a 180° rotating product take-off valve located at the end of the settling leg to allow a charge of particles to flow out of the settling leg, the product take-off valve being operated by a pneumatically driven double-acting actuator, the pneumatic system being regulated by a system comprising pneumatic control valves characterised in that the control valves are V-ball valves.

The invention relates also to the use of V-ball control valves to regulate the pneumatically driven double-acting actuator operating a 180° rotating product take-off valve of the settling leg of a loop reactor.

Finally, the invention relates to a loop reactor comprising a settling leg, a 180° rotating product take-off valve located at the end of the settling leg, the 180° rotating product take-off valve being operated by a pneumatically driven double-acting actuator, the pneumatic system being regulated by a system comprising pneumatic control valves, characterised in that the control valves are V-ball valves.

Preferably, the control valves are automatic control valves.

The invention will now be described with reference to the drawings:

FIG. 4 is a schematic diagram of the pneumatic system.

Figure 1:
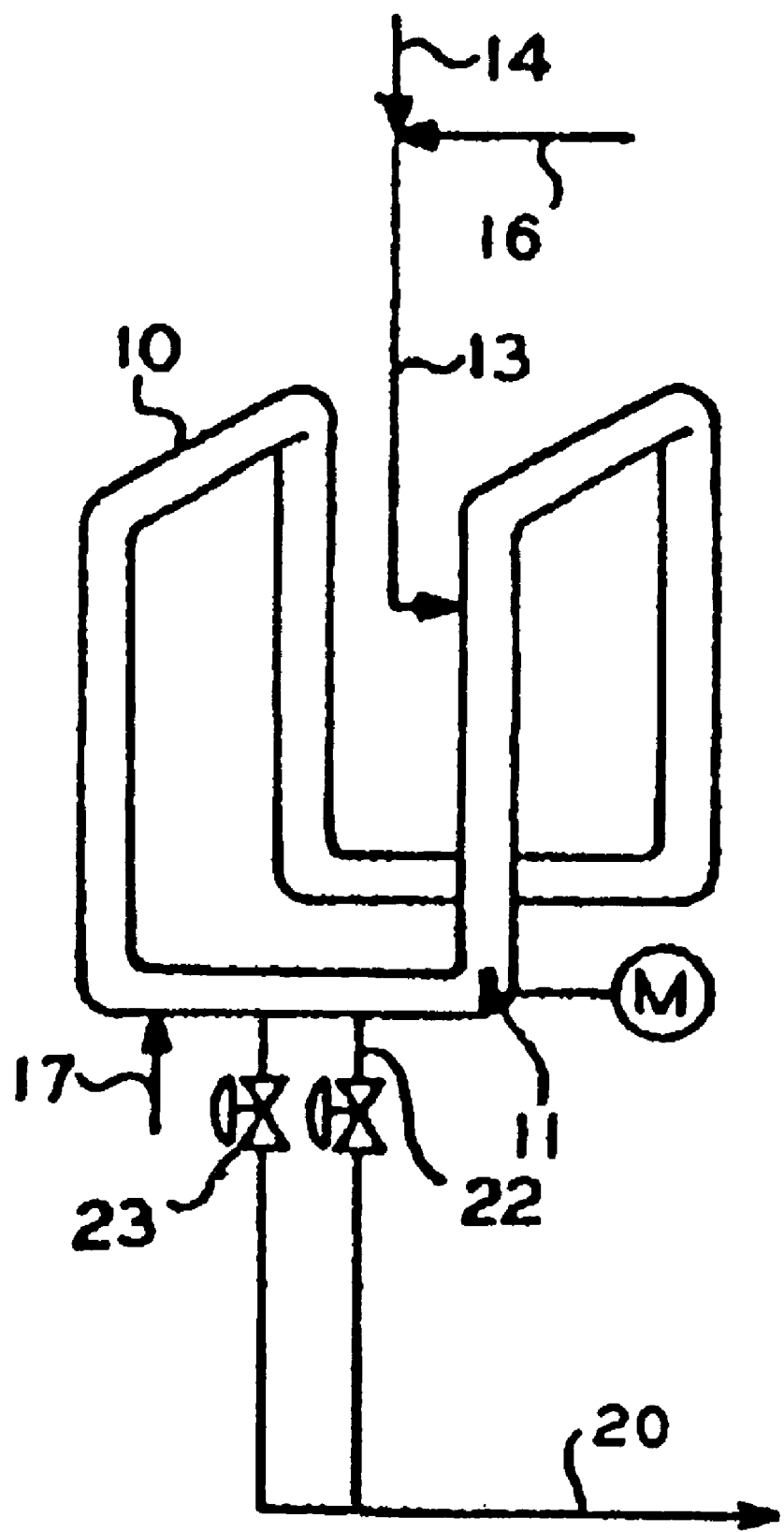
FIG. 1 is a schematic diagram of a loop reactor with two settling legs and their control system.

In the embodiment illustrated in FIG. 1, polymerisation is carried out in a loop reactor 10. The monomer and the diluent are introduced respectively through lines 14 and 16 merging into line 13, and the catalyst is introduced through line 17. A propeller 11 linked to a motor M circulates the mixture. As polymer particles are produced, they accumulate in settling legs 22. The settling legs are each provided with a product take-off valve (PTO valve or PTO) 23 connected to a conduit 20.

Figure 2:
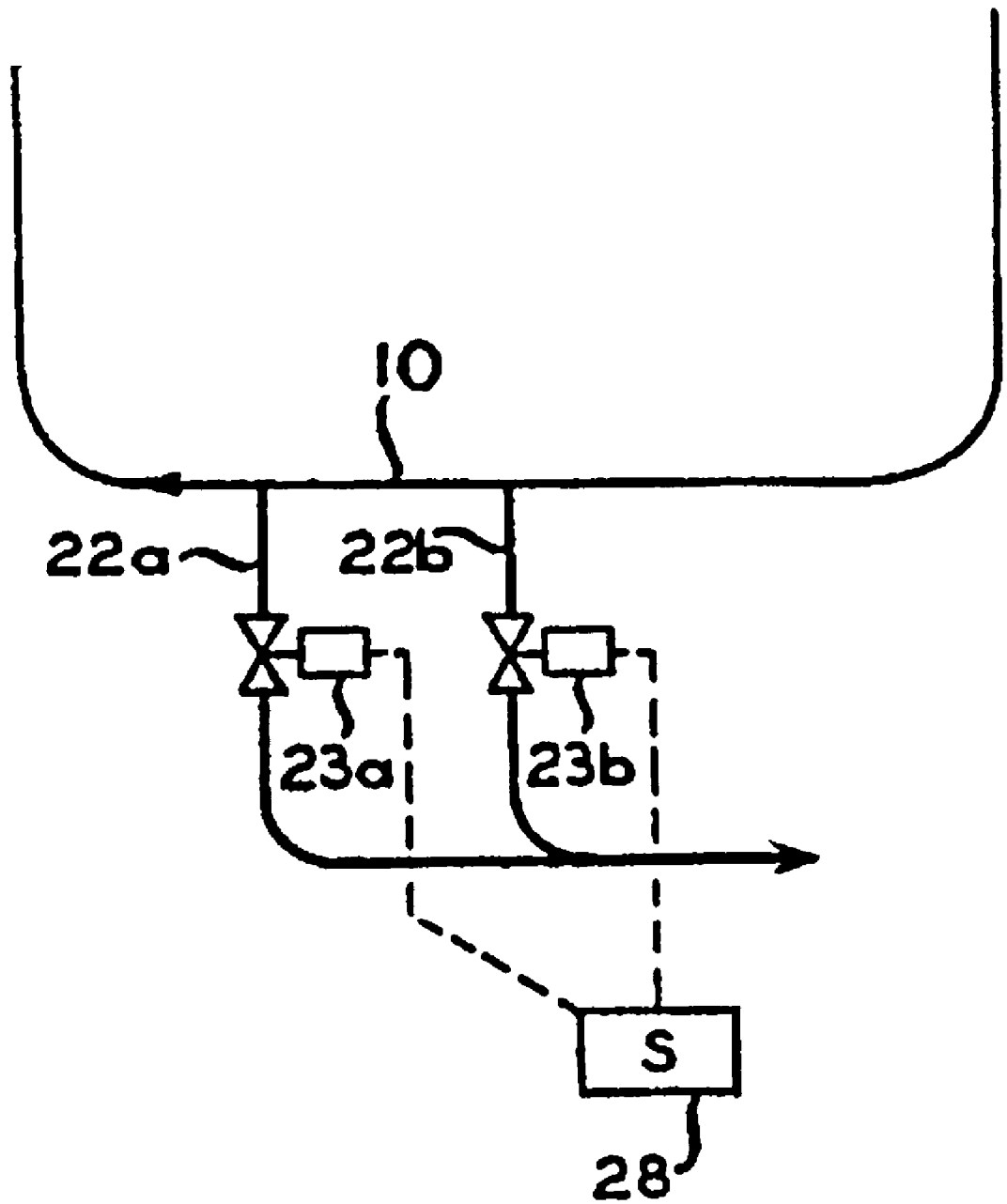
FIG. 2 is a schematic diagram of the control system.

Referring now to FIG. 2, there is shown a loop reactor 10 provided with two settling legs 22a and 22b, each provided with a PTO valve (respectively 23a and 23b) controlled by a control unit 28.

Figure 3:
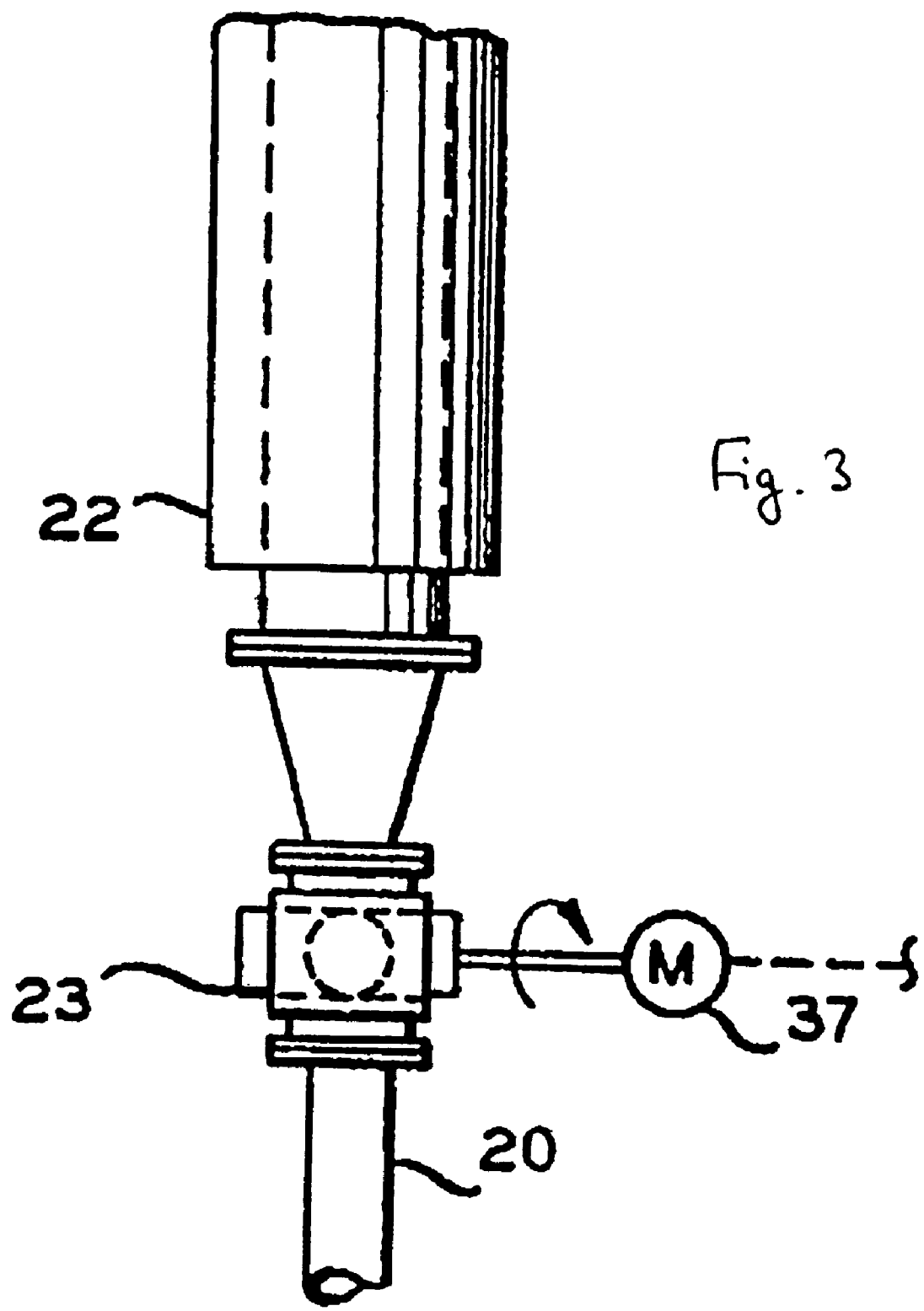
FIG. 3 is a schematic diagram of the bottom part of a settling leg, showing the product take-off valve and its actuating mechanism.

FIG. 3 shows the bottom of a settling leg 22, with a PTO valve 23 connecting it to conduit 20. The PTO valve is a rotating valve, the rotation being controlled by a mechanism M.

The PTO valve 23 of the settling leg 22 is only periodically opened, whereby the polymer particles present in the settling leg 22 can pass into conduit 20. The opening time of the PTO valve 23 should be closely controlled, in order that substantially all particles present in the settling leg 22 pass into conduit 20, whilst substantially no monomer and diluent leave the reactor 10.

Two types of PTO valves are in use. The most common relies on a 180° rotation of the moving part of the valve, whereby the valve turns from closed (0°) to open (90°) then closed (180°); during the next cycle, the valve rotates backwards. Valves with a 90° rotation are also in use, whereby the moving part turns from closed (0°) to open (90°) then backwards to closed (0°). The present invention provides an improved control system for the first type of PTO valves.

PTO valves are generally pneumatically actuated. FIG. 4a shows that each PTO valve 23 is provided with a double acting pneumatic actuator 40, which controls the speed at which it turns. In the case of a 180° rotation, the speed at which the PTO turns is particularly important in the sense that it directly controls the time it remains open.

The air flow sent to the double acting pneumatic actuator 40 is directed by a two-way system 45 driven by a solenoid. FIG. 4b shows one position of the system 45, wherein air coming from conduit 50 is sent via conduit 42 into the actuator 40, returns via conduit 41 and exits through conduit 51. FIG. 4c shows the other position of the system 45, wherein air coming from conduit 50 is sent via conduit 41 into the actuator 40, returns via conduit 42 and exits through conduit 52.

Pneumatically actuated PTO valves were always controlled by manually adjusting the outlet flow of air using control valves 61 and 62. There is provided a separate control for each valve 61 and 62, in case the ball in the PTO valve 23 would turn at different speed in each direction.

It has now been surprisingly found that control of a PTO valve 23 is improved by using automatic control valves 61 and 62. In a preferred embodiment, V-ball control valves are used. Such valves throttle using the rotation of a notched ball segment whose shape is such that it allows at the same time to have a very precise control of the flow air for small openings while having a full bore opening when needed. As an example of V-ball valve, there can be cited a Worcester V-flow control valve type V44-66UMPTN90.

It was not obvious to find appropriate control valves 61 and 62, because all control valves tested up to now did not provide a precise control of the flow of air, taking into account that the amount of air in the actuator 40 is relatively small. More importantly, it was not obvious that operation of the reactor 10 would be more stable.

The use of automatic control valves provides several advantages with regard to a better reliability of the PTO valves. Indeed, the frequent operation of the PTO valves, such as every 15 to 90 seconds, leads to the wear of said valves which then operate slower. This effect is immediately compensated by an automatic increasing of the amount of air needed by the actuators. An automatic control of the amount of air needed by the actuators avoids that the PTO valves get stuck in an open position. The use of automatic control valves allows also a more precise control of the amount of air entering into the actuators than the manual control valves do. When using manual control valves, there is always a risk that when reducing the amount of air entering into the actuators, the PTO valves finally get blocked in an open position leading to the depressurisation of the reactor. This may occur with the first reactor of a double loop system when long opening times of the PTO valve of said reactor are needed.

The use of automatic control valves and of 180° rotating PTO valves allows a good control opening time of said PTO valves. This could not be achieved in the same way by using 90° rotating PTO valves.

It has also been found that the inner volume of conduits 51 and 52 had to be reduced to the maximum possible without creating a restriction to airflow. Conduits 51 and 52 have a diameter ranging from 1.27 cm (½ inch) to 2.54 cm (1 inch), preferably said conduits have a diameter of about 1.9 cm (¾ inch). Conduits 51 and 52 have a length of less than 150 cm, preferably less than 100 cm. In a most preferred embodiment, conduits 51 and 52 have a diameter of about 1.9 cm (¾ inch) and a length of about 20 cm between the system 45 to the automatic control valves 61 and 62.

Figure 5:
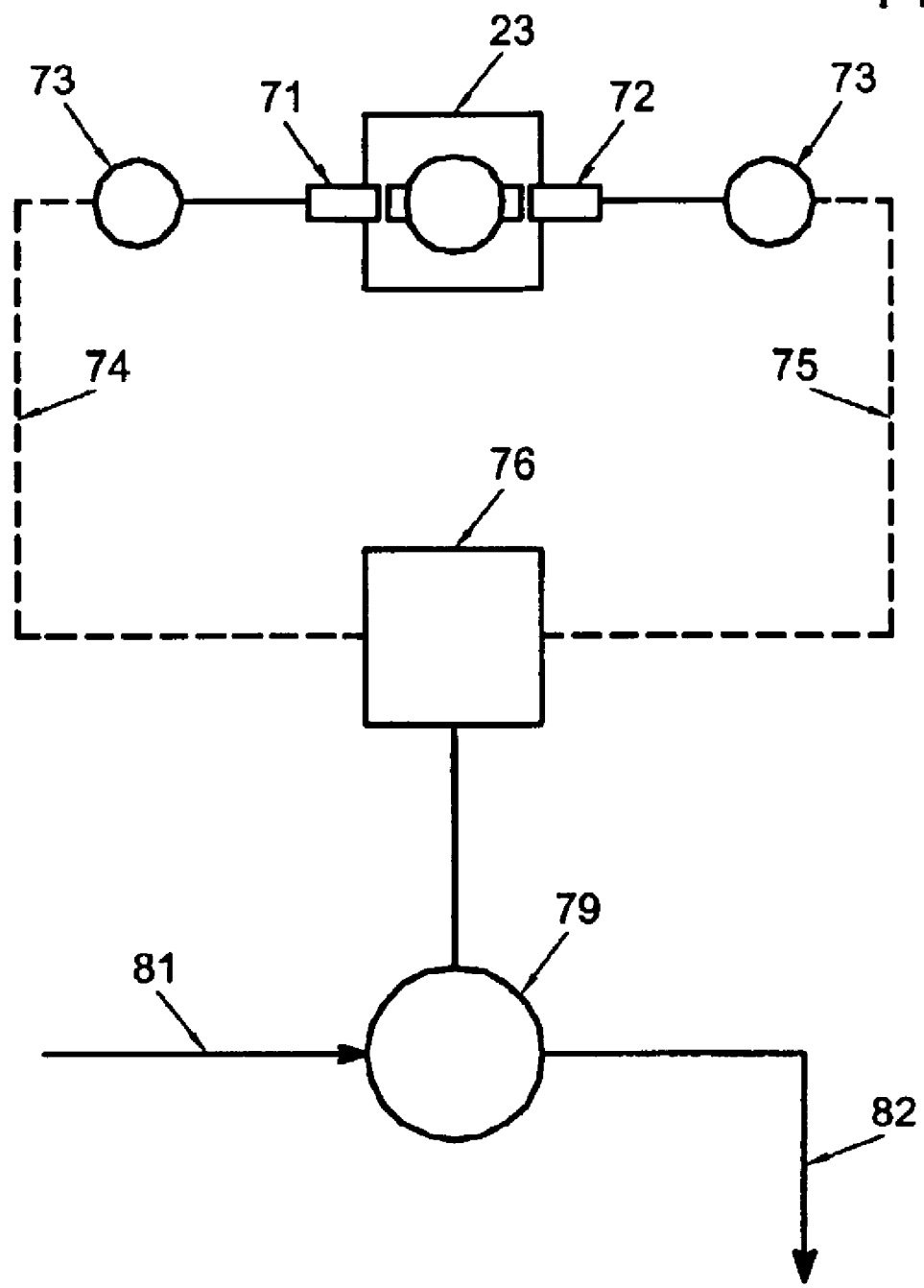
FIG. 5 is a schematic diagram of the electronic control system.

Referring now to FIG. 5, there is shown a preferred embodiment of the control mechanism. The PTO valve 23 is provided with sensors 71 and 72, located in the double actuating actuator, which indicate the position of the valve 23. Information from the sensors 71 and 72 is sent respectively via transmitter 73 and cables 74 and 75 to a computer 76 to determine the rotation time of the PTO valve. The rotation time of the PTO valve is sent to a rotation controller 79, which also receives a set point for rotation time 81 of the PTO valve from the operator. Depending on the difference between the rotation time of the working PTO valve and of the desired rotation time introduced by the operator, a signal 82 is sent to the control V-ball valves, the opening of the V-ball valve either increases by 1% at every cycle when the rotation time is slower than the operator set point or decreases by 1% when the rotation time is faster than the operator set time.

The set point of the rotation time of the PTO valve may be adjusted manually by the operator or controlled by the system as a function of the reactor pressure drop at each opening of the reactor.

EXAMPLE AND COMPARATIVE EXAMPLE

A loop reactor was fitted with a system according to the invention. The loop reactor had the following characteristics:
nominal capacity: 5.5 tons/hr.
volume: 19 m³
number of settling legs: 4
size of the settling legs: 20.3 cm
size of the flash lines: 7.6 cm
size of the PTO valves: 5 cm The double acting actuators 40 of the PTO valves 23 were each provided with a control system according to FIG. 4. The conduits 41 and 42 had a 1.27 cm (½ inch) diameter and a 3 m length. The automatic control valves 61 and 62 were Worcester V-flow control valves type V44-66UMPTN90 with a Cv of 8, connected to the system 45 by conduits of 1.9 cm (¾ inch) diameter and 20 cm length.

The stability of the operation of the reactor was measured in regard of the variations of the pressure measured in the reactor. The reactor operation was very stable. Indeed, said variations were lower by 25% when compared to those of a comparative reactor equipped with control valves 61 and 62 of the manually controlled type, the other characteristics of the comparative reactor being the same as those of the example. In addition, in the comparative reactor, the capacity of each settling leg was lower by 10%.

The invention claimed is:

1. A method for operating an olefin polymerization loop reactor system comprising:
   introducing an olefin, a polymerization catalyst, and a diluent carrier liquid into a loop reactor, wherein the loop reactor comprises a circulating pump, a settling leg and a 180° rotating product take-off valve operably connected to the settling leg for the removal of polymer therefrom;
   contacting the olefin with the polymerization catalyst in the presence of the diluent carrier liquid to form a slurry of polymer particles within the loop reactor; and
   withdrawing polymer particles from the settling leg through the 180° rotating take-off valve, wherein the polymer particles are withdrawn from the settling leg at a predetermined time interval, the predetermined time interval adapted to provide for removal of substantially all polymer particles from the settling leg with substantially no removal of olefin and diluent from the loop reactor; and
   maintaining the predetermined time interval by automatically controlling and adjusting air flow passing to the 180° rotating take-off valve for operation thereof, wherein the predetermined time interval is automatically controlled by a pneumatically driven double-acting actuator.

* * * * *